US006347358B1

(12) United States Patent
Kuwata (10) Patent No.: US 6,347,358 B1
(45) Date of Patent: Feb. 12, 2002

(54) DISK CONTROL UNIT AND DISK CONTROL METHOD

(75) Inventor: Atsushi Kuwata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/460,979

(22) Filed: Dec. 15, 1999

(30) Foreign Application Priority Data

Dec. 22, 1998 (JP) .......................................... 10-365287

(51) Int. Cl.$^7$ .............................................. G06F 13/14
(52) U.S. Cl. ......................... 711/113; 711/114; 711/129
(58) Field of Search ........................ 711/113–114, 129, 711/152, 153, 173

(56) References Cited

U.S. PATENT DOCUMENTS

| 5,917,723 A | * | 6/1999 | Binford ....................... 364/131 |
| 5,991,775 A | * | 11/1999 | Beardsley et al. ........... 707/205 |
| 6,049,850 A | * | 4/2000 | Vishlitzky ................... 711/136 |
| 6,148,368 A | * | 11/2000 | DeKoning ................... 711/113 |
| 2001/0002480 A1 | * | 5/2001 | DeKoning et al. .......... 711/130 |

FOREIGN PATENT DOCUMENTS

| JP | 59-123952 | 7/1984 |
| JP | 63-115224 | 5/1988 |
| JP | 2-28851 | 1/1990 |
| JP | 4-264940 | 9/1992 |
| JP | 8-115257 | 5/1996 |

* cited by examiner

Primary Examiner—Matthew Kim
Assistant Examiner—Denise Tran
(74) Attorney, Agent, or Firm—McGinn & Gibb, PLLC (57) ABSTRACT

The present invention discloses a disk control unit which improves the use of a cache in a disk unit to increase concurrent access speeds. The disk control unit comprises a plurality of directors each independently controlling an I/O operation between a plurality of hosts and a disk unit, a cache memory connected to the directors and having a plurality of cache areas provided according to the configuration of the disk unit, and a plurality of cache management areas each provided for each of the cache areas for keeping track of whether or not the cache area is used by any of the directors. In addition, the disk control unit has an exclusive control unit which allows each director to reference the cache management area to place the cache area under exclusive control.

10 Claims, 7 Drawing Sheets

| LOGICAL DISK 0 | CACHE PARTITION 0 |
|---|---|
| LOGICAL DISK 1 | CACHE PARTITION 1 |
| LOGICAL DISK 2 | CACHE PARTITION 2 |
| LOGICAL DISK 3 | CACHE PARTITION 3 |

DISK CONTROL UNIT AND DISK CONTROL METHOD

BACKGROUND OF THE INVENTION

1. Field of the Invention

The present invention relates to a disk control unit, and more particularly to a disk control unit which controls concurrent access to a disk unit having a plurality of logical drives. The present invention applies advantageously to a magnetic disk unit, an optical disc unit, and a disk array unit.

2. Description of the Related Art

It is essential for a disk array unit to have a cache memory to increase throughput. Data in frequently-accessed areas, which are usually located only in a limited part of the disk array unit, is copied into the cache memory to respond to the host computer more quickly.

A RAID5 disk array performs specific processing, called write penalty, to prevent disk array performance from being decreased. Recently, as a disk array becomes larger, a larger cache memory is required to maintain throughput.

Another technology to increase throughput is implemented by a multi-director system composed of a plurality of directors which perform I/O processing in order to distribute the load among them. This multi-director system allows host directors to concurrently process I/O requests from a plurality of hosts or I/O requests issued concurrently from one host. In addition, the multi-director system allows a disk director to access physical disks independently within the disk array to asynchronously execute high-priority host-to-cache data transfer and background cache-to-disk data transfer, thus increasing throughput.

Figure 7:
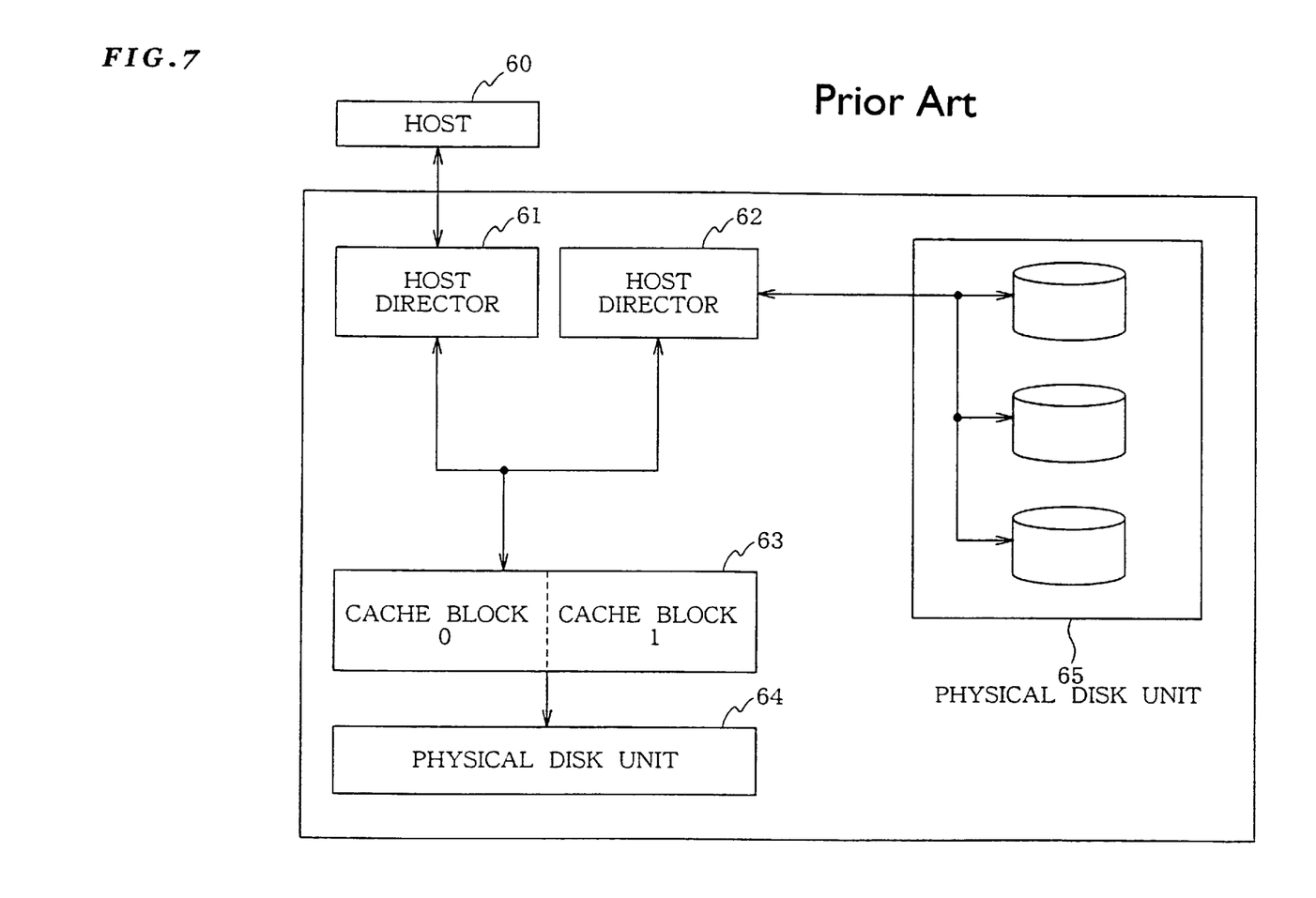
FIG. 7 is a block diagram showing the configuration of a disk control unit according to the prior art.

FIG. 7 shows a magnetic disk control unit disclosed in Japanese Patent Laid-Open Publication No. Hei 8-115257. This control unit has a disk cache memory that is divided into a plurality of blocks each with a corresponding write count management table. This table keeps track of block usage status to control access to disk cache blocks.

Although the multi-director system allows I/O processing to be executed concurrently, only one director can access the cache memory management area at a time. When using cache memory, each director searches, allocates, or exclusively controls the cache memory, or deletes data from it. In doing so, each director must process data in the cache memory management area exclusively. This means that, when a plurality of directors want to access the cache memory management area at the same time, only one director is allowed to do so and the remaining directors are put in the wait state. Therefore, an increase in the number of directors results in a conflict of requests for access to the cache memory management area, sometimes reducing the advantage of the multi-director system.

SUMMARY OF THE INVENTION

The present invention seeks to solve the problems associated with the prior art described above. It is an object of the present invention to provide a disk control unit and a disk control method which improve the usage of a cache memory in a disk unit to increase the speed of concurrent access to the cache memory.

It is another object of the present invention to provide a disk control unit and a disk control method which provide quick access to a disk array unit with a plurality of directors.

It is still another object of the present invention to provide a disk control unit and a disk control method which allow a plurality of hosts to access volumes, which are logical disks, at an equal speed.

The present invention provides a disk control unit comprising a plurality of directors each individually and independently controlling I/O processing between one of a plurality of hosts and a disk unit; a cache memory connected to the directors and having a plurality of cache areas provided according to a configuration of the disk unit; and a plurality of cache management areas each provided for each cache area for checking if the cache area is used by one of the directors. In addition, an exclusive control unit is provided to cause each of the directors to reference the cache management area to exclusively control the cache area.

Each director performs I/O processing between the host and the disk unit via the cache memory. At this time, each director performs its own I/O processing independently of I/O processing performed by other directors. That is, the directors perform concurrent I/O processing. The director references the cache management area to exclusively control the cache area. Therefore, even when one director uses one cache area, other directors may use other cache areas concurrently. This disk control unit makes it possible for a plurality of directors to make faster concurrent processing.

DESCRIPTION OF THE PREFERRED EMBODIMENTS

Figure 1:
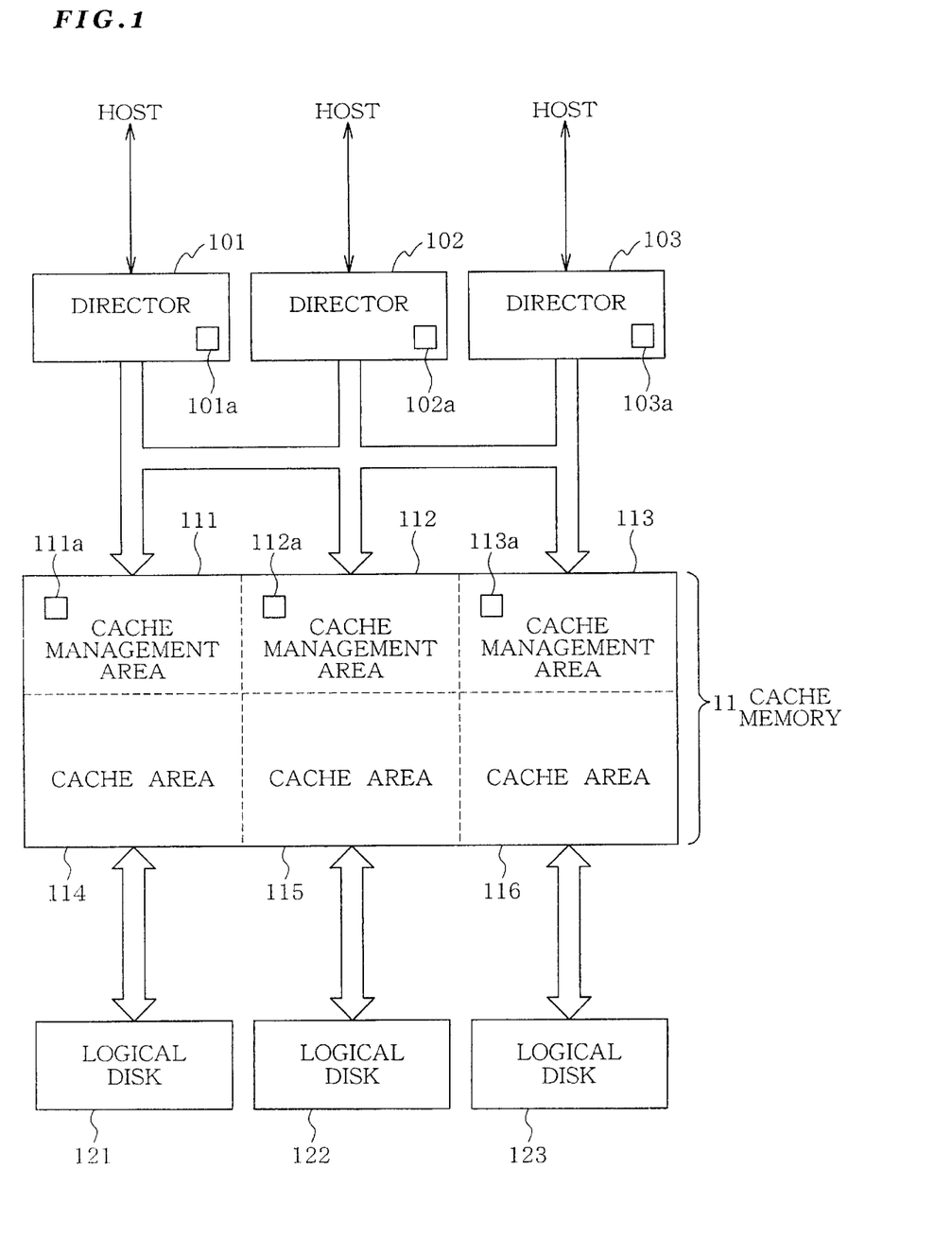
FIG. 1 is a diagram showing the basic relation between a cache memory and directors according to the present invention.
Figure 2:
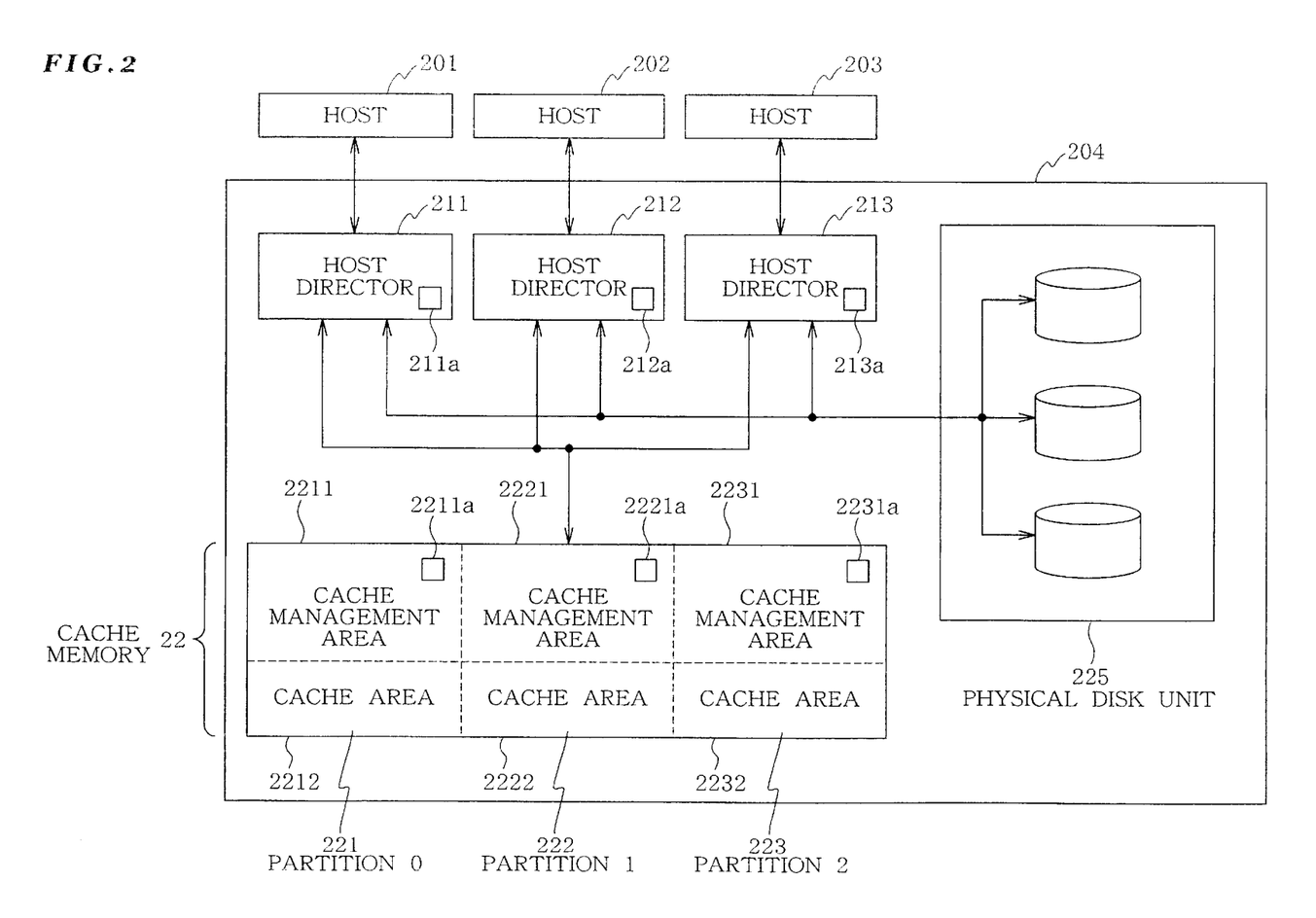
FIG. 2 is a block diagram showing the configuration of a first embodiment of the present invention.

Some embodiments of the present invention will be described in detail by referring to the attached drawings. FIG. 1 is a diagram showing the basic relation between a cache memory and directors according to the present invention. FIG. 2 is a block diagram showing the configuration of a first embodiment of the present invention.

Referring to FIG. 1, a cache memory 11 is divided into three partitions. Each partition is composed of a cache management area, 111–113, and a cache area, 114–116. (Because data read from, or written to, cache partitions is actually read from, or written to, cache areas, cache partitions and cache areas are sometimes used interchangeably in the following description.) While a director 101 is accessing the cache management area 111, other directors are inhibited from accessing the cache management area 111 but not inhibited from accessing the cache management area 112 and cache management area 113. Therefore, a director 102 can access the cache management area 112 concurrently with the director 101 that is accessing the cache management area 111.

In the example shown in FIG. 1, three cache areas, 114–116, are provided, each for one of three logical disks, 121–123. Data which will be written to, or which has been read from, the first logical disk 121 is cached in the first cache partition 114. Each logical disk is paired with the corresponding cache partition, 114–116, and these pairs are independent with each other. For example, data read from the second logical disk 122 is never stored in the cache partition 116.

FIG. 1 shows the configuration in which one logical disk unit corresponds to one cache area. However, disk units need not always correspond to cache areas on a one-to-one basis. A plurality of areas, each allocated on one logical disk and delimited by logical addresses, may be assigned to cache partitions on a one-to-one basis.

In the example shown in FIG. 1, the directors 101–103 each have a correspondence table, 101a–103a. This table describes the relation between a logical address specified by a host at access time and a logical disk corresponding to the logical address. The table also serves as a table describing the relation between a volume name and a logical disk when a host accesses a logical disk by specifying the volume name which is the logical disk name. In addition, when one disk unit is divided into a plurality of logical disks, the table serves as a table describing the relation between a logical disk allocated on the disk unit and a logical address used by the host unit at access time.

Each of the directors 101–103, when accessed by the host, references the internal correspondence table, 101a–103a, to identify one of logical disks, 121–123, to be accessed. The director then identifies an available cache area, 114–116, because the relation between the logical disks 121–123 and cache partitions 114–116 is predefined. Once the cache area to be accessed is determined, the director, 101–103, accesses the cache management area, 111–113, corresponding to the cache partition 114–116. As shown in FIG. 1, the cache management areas 111–113 each contain a usage flag, 111a–113a, to indicate the usage status of the corresponding cache partition, 114–116. Thus, the director, 101–103, first checks the usage flag, 111a–113a, corresponding to the cache partition, 114–116, to be used.

When the usage flag is off to indicate that the cache area is available for use, the director executes the access request received from the host. On the other hand, when the usage flag is on to indicate that the cache area and the logical disk are being used by some other director, the director delays the access request received from the host.

In this embodiment, this exclusive control of cache areas and logical disks is performed for each logical disk. Therefore, while the first director 101 is performing I/O operation on the logical disk 121, the second director 102 may access the second logical disk 122 or the third logical disk 123.

Next, FIG. 2 shows the configuration of the first embodiment according to the present invention. A disk array 204 is connected to three hosts, 201, 202, and 203, via three host directors 211, 212, and 213. The disk array 204 comprises a cache memory 22, host directors 211, 212, and 213, and a physical disk unit 225. The cache memory 22 is divided logically into three partitions 221, 222, and 223. Each partition is composed of a cache management area, 2211, 2221, or 2231, and a cache area, 2212, 2222, or 2232.

Figure 3:
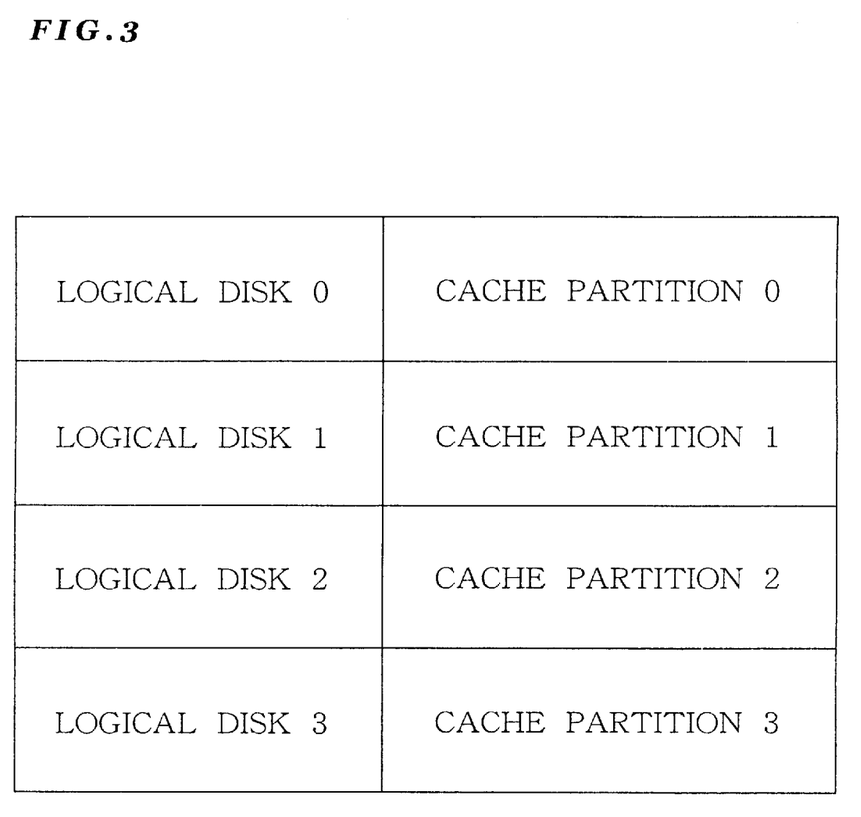
FIG. 3 is a diagram showing the correspondence between logical addresses and cache partitions.

FIG. 3 shows a correspondence table 211a showing the correspondence between logical addresses and cache partitions. In this table, the logical space on logical disks 0 and 3 is allocated to cache partition 0, the logical space on logical disk 1 is allocated to cache partition 1, and the logical space on logical disk 2 is allocated to cache partition 2.

Figure 4:
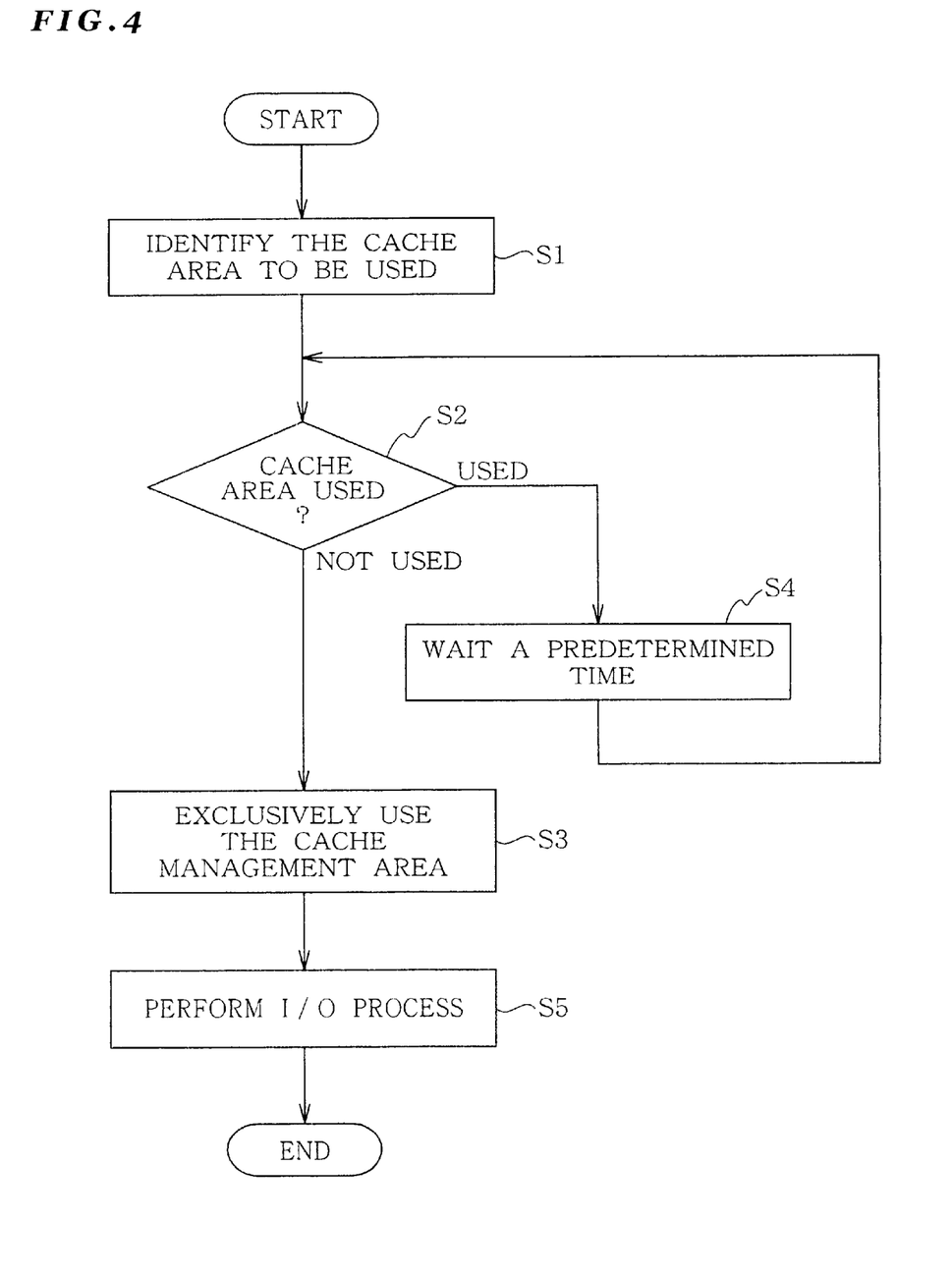
FIG. 4 is a flowchart showing an example of operation of the embodiment in the configuration shown in FIG. 2.

The operation of the first embodiment will be described with reference to FIG. 4. Now, assume that the host 201 has issued an access request to logical disk 0. In response to this request, the host director 211 checks the correspondence table 211a, shown in FIG. 3, to find that cache partition 0 will be used (step S1). The host director 211 then references a usage flag 2211a in the cache management area 2211 to check if the cache management area 2211 is being used (step S2). If the cache management area 2211 is not being used, the host director 211 exclusively uses the cache management area 2211 (step S3) and turns on the usage flag 2211a of the cache management area 2211 to indicate to other directors that the area is being used. Turning on the flag puts the cache management area 2211 under exclusive control to prevent other directors from accessing the area. Also assume that, almost at the same time the host 201 has issued the access request to logical disk 0, the host 202 has issued an access request to logical disk 1. In this case, the host director 212 must access the cache management area 2221 to use cache partition 1 which corresponds to logical disk 1. The cache management area 2221 is ready for use because it is not under exclusive control. Upon completion of the access request issued from the host 201 to logical disk 0 (step S5), the host director 211 turns off the usage flag to release the exclusive control of the cache management area 2211. On the other hand, if the cache partition to be used is in use, the director waits a predetermined time (step S4) and checks the flag again if the cache area is being used.

Figure 5:
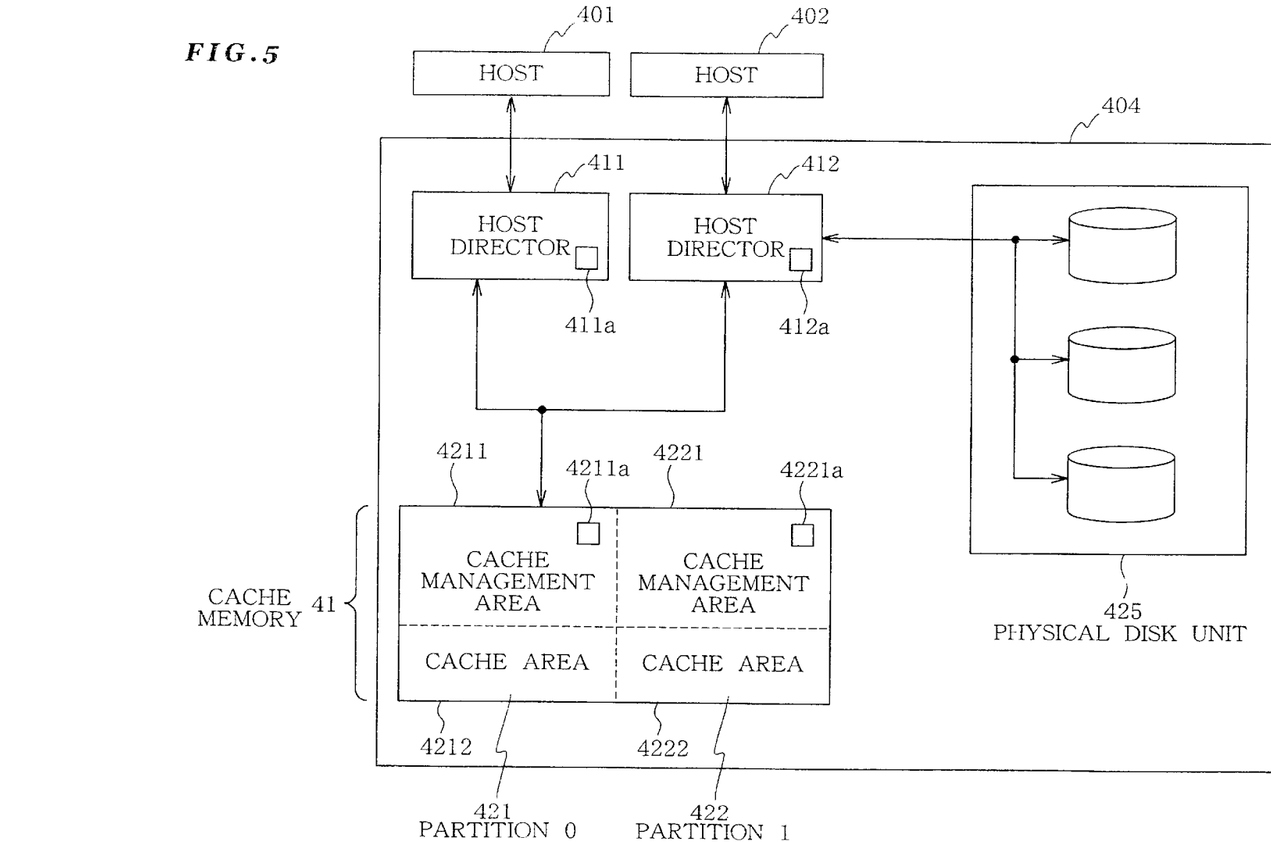
FIG. 5 is a block diagram showing the configuration of a second embodiment of the present invention.

Next, a second embodiment of the present invention will be described with reference to FIG. 5. Referring to the figure, a disk array 404 comprises a cache memory 41, a host director 411 connected to a host 401, a physical disk unit 425, and a disk director 412 connected to the physical disk unit 425. The cache memory 41 is divided into cache partitions 421 and 422. The cache partition 421 comprises a cache management area 4211 and a cache area 4212. The cache-partition 422 comprises a cache management area 4221 and a cache area 4222.

In this disk array 404, the host director 411 that transfers data to or from the host 401 and the disk director 412 that accesses the physical disk unit 425 perform operation independently.

Now, assume that the host 401 issues a plurality of write requests continuously. The host director 411 distributes those write requests between two cache partitions, 421 and 422, according to logical addresses. On the other hand, the disk director 412 writes data from the cache to the physical disk unit 425 concurrently with the host director 411. In this configuration, even when both directors, 411 and 412, must access the cache management areas 4211 and 4221 almost at the same time, they can access the desired partition if they access different partitions. Therefore, this configuration ensures an increased throughput.

Figure 6:
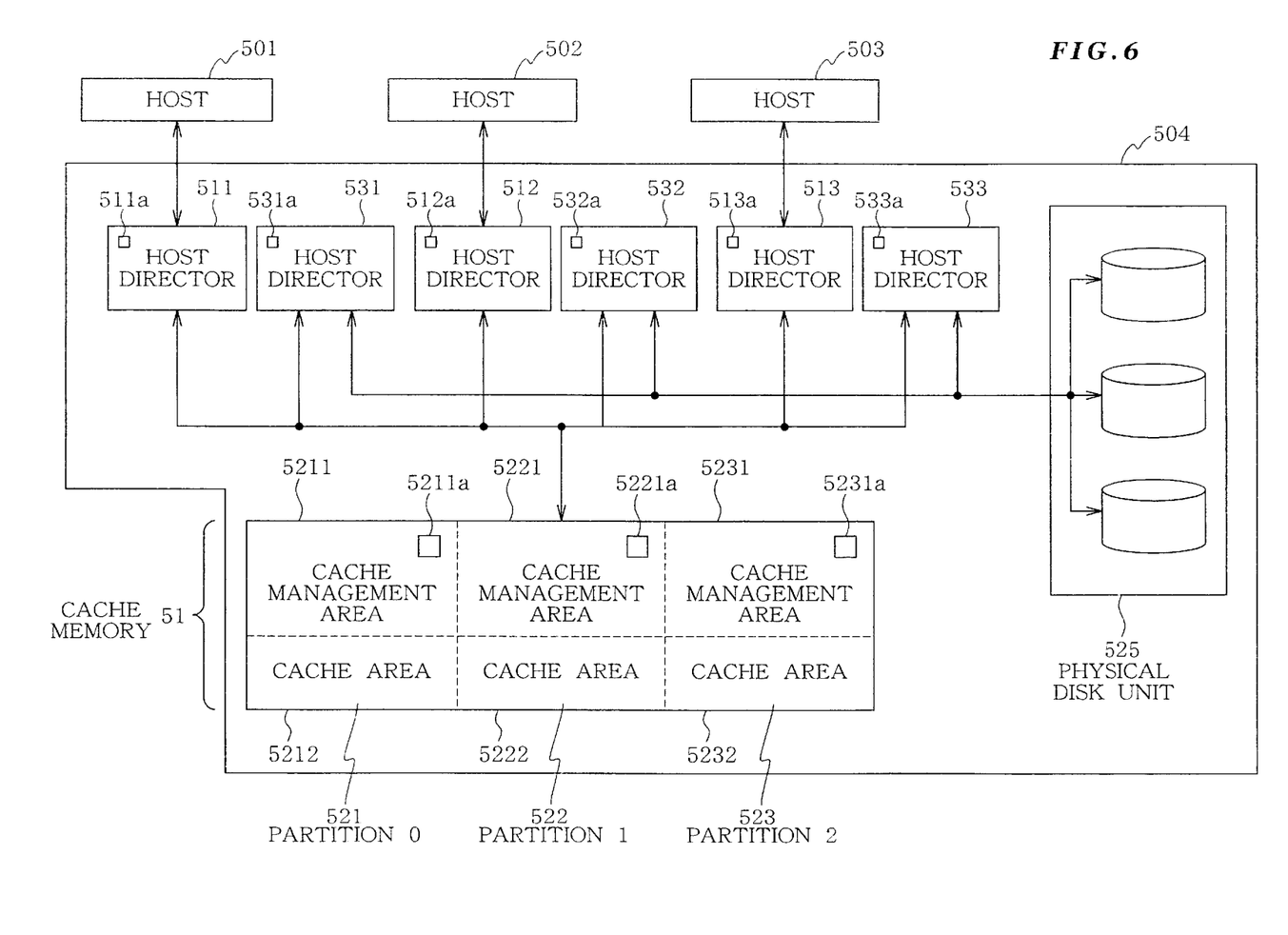
FIG. 6 is a block diagram showing the configuration of a third embodiment of the present invention.

FIG. 6 shows the configuration of an embodiment used in a third embodiment of the present invention. A disk array 504 is connected to three hosts 501, 502, and 503 via three host directors 511, 512, and 513. The disk array 504 comprises a cache memory 51, the host directors 511, 512, and 513, a physical disk unit 525, and disk directors 531, 532, and 533 connected to the physical disk unit 525. The cache memory 51 is divided logically into three partitions 521, 522, and 523. They have cache management areas 5211, 5221, and 5231 and cache areas 5212, 5222, and 5232, respectively.

Next, the operation of the third embodiment will be described. First, assume that the host 501 has issued an access request to logical disk 0. The host director 511 accesses the cache management area 5211 because, as shown in FIG. 3, logical disk 0 corresponds to cache partition 0. While the host director 511 is using cache management area 5211, this area is under exclusive control and no other director can access it. Also assume that the host 502 has issued an access request to logical disk 1 almost at the same time. The host director 512 must access the cache management area 5221 because, as shown in FIG. 3, logical disk 1 corresponds to cache partition 1. The host director 512 can access the cache management area 5221 immediately because it is not under exclusive control.

Now, assume that the host 501 issues a plurality of write requests continuously. The host director 511 distributes those write requests between two cache partitions, 521 and 522, according to logical addresses. On the other hand, the disk director 531 writes data written into the cache to the physical disk unit 525 concurrently with the host director 511. In this configuration, even when both directors, 511 and 531, must access the cache management areas 5211 and 5221 almost at the same time, they can access the desired partition if they access different partitions. Therefore, this configuration ensures an increased throughput.

According to the present invention, even when a plurality of I/O requests are issued from a plurality of hosts, the I/O requests may be processed with no conflict in accessing cache management areas. The throughput is therefore increased. This is because a plurality of cache partitions are independent with each other and only the partition to be accessed is placed under exclusive control.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-365287 (Filed on Dec. 22, 1998) including specification, claims, drawings and summary are incorporated herein by reference in its entirety.

What is claimed is:

1. A disk control unit comprising:
   a plurality of directors each individually and independently controlling I/O (input/output) processing between one of a plurality of hosts and a disk unit;
   a cache memory connected to the directors and having a plurality of cache areas provided according to a configuration of said disk unit; and
   a plurality of cache management areas each provided for each cache area for checking if the cache area is used by one of said directors,
   wherein an exclusive control unit is provided to cause each of said directors to reference said cache management area to exclusively control the cache area.

2. The disk control unit according to claim 1 wherein said exclusive control unit has a function which, when using said cache area, turns on a usage flag in the cache management area connected to the cache area and a function which waits until the usage flag becomes off if the usage flag of the cache area to be used is on, said usage flag indicating whether or not the cache area is being used.

3. The disk control unit according to claim 1 wherein said cache memory has a plurality of cache areas each corresponding to one of logical disks of said disk unit.

4. The disk control unit according to claim 3 wherein each of said cache areas has a size proportional to a ratio of the size of each of said logical disks to a total size of the logical disks.

5. The disk control unit according to claim 1 wherein said cache memory has the cache areas corresponding to a plurality of areas delimited by logical addresses on said disk unit.

6. The disk control unit according to claim 1 wherein said disk is a RAID5 disk array unit.

7. The disk control unit according to claim 1 wherein one or more of said directors are host directors which process I/O operation with said hosts and other directors are disk directors which process I/O operation with said disk unit.

8. A disk control method for use on a disk control unit which has a plurality of directors each individually and independently controlling I/O processing between one of a plurality of hosts and a disk unit; a cache memory connected to the directors and having a plurality of cache areas provided according to a configuration of said disk unit; and a plurality of cache management areas each provided for each cache area for checking if the cache area is used by one of said directors, said method comprising the steps of:
   in response to an I/O request from one of said hosts, identifying one of the cache areas to be used;
   referencing the cache management area corresponding to the identified cache area to check if the cache area is being used; and
   processing said I/O request using the cache area if the cache area is not being used by other directors.

9. The disk control method according to claim 8, further comprising the step of:
   if the cache area is being used by some other director, waiting for said other director to complete processing.

10. A disk control unit comprising:
    a plurality of directors each individually and independently controlling I/O processing between one of a plurality of hosts and a disk unit;
    a cache memory connected to the directors and having a plurality of cache areas provided according to a configuration of said disk unit;
    a plurality of cache management areas each provided for each cache area for checking if the cache area is used by one of said directors;
    means for identifying one of the cache areas to be used in response to an I/O request from one of said hosts;
    means for referencing the cache management area corresponding to the identified cache area to check if the cache area is being used;
    means for processing said I/O request using the cache area if the cache area is not being used by some other director; and
    means for waiting for said other director to complete processing if the cache area is being used by said other director.

* * * * *